(12) United States Patent
Xu et al.

(10) Patent No.: US 11,435,635 B2
(45) Date of Patent: Sep. 6, 2022

(54) THIN FILM TRANSISTOR SUBSTRATE, AND LIQUID CRYSTAL DISPLAY PANEL USING SAME

(71) Applicant: Century Technology (Shenzhen) Corporation Limited, Shenzhen (CN)

(72) Inventors: Qi Xu, Shenzhen (CN); Ya-Ke Zhang, Shenzhen (CN); Sheng Xiao, Shenzhen (CN); Tao Wang, Shenzhen (CN); Chih-Chung Liu, New Taipei (TW); Meng-Chieh Tai, New Taipei (TW)

(73) Assignee: Century Technology (Shenzhen) Corporation Limited, Shenzhen (CN)

( * ) Notice: Subject to any disclaimer, the term of this patent is extended or adjusted under 35 U.S.C. 154(b) by 0 days.

(21) Appl. No.: 17/237,637

(22) Filed: Apr. 22, 2021

(65) Prior Publication Data
US 2022/0113578 A1      Apr. 14, 2022

(30) Foreign Application Priority Data
Oct. 12, 2020   (CN) .......................... 202011085866.9

(51) Int. Cl.
G02F 1/1362     (2006.01)
G02F 1/1368     (2006.01)

(52) U.S. Cl.
CPC .... *G02F 1/13629* (2021.01); *G02F 1/136204* (2013.01); *G02F 1/1368* (2013.01)

(58) Field of Classification Search
CPC .......... G02F 1/13629; G02F 1/136204; G02F 1/1368
USPC ...................................... 349/40, 54–55, 192
See application file for complete search history.

(56) References Cited

U.S. PATENT DOCUMENTS

2017/0357353 A1*   12/2017   Katsuta ............... G06F 3/04164

\* cited by examiner

*Primary Examiner* — Charles S Chang
(74) *Attorney, Agent, or Firm* — ScienBiziP, P.C.

(57) ABSTRACT

A thin film transistor substrate allowing an increase in proportionate size of the display area includes gate driving units, signal test pads, a first function line, and a first-stage gate output signal line in a surrounding non-display area, the display area having pixels. The gate driving units include a first-stage gate driving unit with an output terminal electrically connected to one row of pixels. The first function line has a first function but can also multiplex as a connecting line between the first-stage gate output signal line and one test pad. The first-stage gate output signal line is electrically insulated from the first function line during the first function of the first function line but is electrically connected to the first function line when multiplexed.

18 Claims, 6 Drawing Sheets

100

THIN FILM TRANSISTOR SUBSTRATE, AND LIQUID CRYSTAL DISPLAY PANEL USING SAME

FIELD

The subject matter herein generally relates to displays, specifically a thin film transistor substrate, and a liquid crystal display panel using the thin film transistor substrate.

BACKGROUND

In order to test whether signals provided by a driving circuit to a display panel are normal, a plurality of test pads is arranged in a non-display area of the display panel. The signal lines in the non-display area (e.g., common electrode line, electrostatic protection line, gate signal line, first-stage gate output signal line, and final-stage gate output signal line) are connected to the test pads for testing. However, such a design of the signal lines and the test pads occupies a large space, which is not beneficial to achieving a narrow border of the display panel.

Therefore, there is room for improvement in the art.

BRIEF DESCRIPTION OF THE DRAWINGS

Implementations of the present disclosure will now be described, by way of embodiments, with reference to the attached figures.

DETAILED DESCRIPTION

Figure 1:
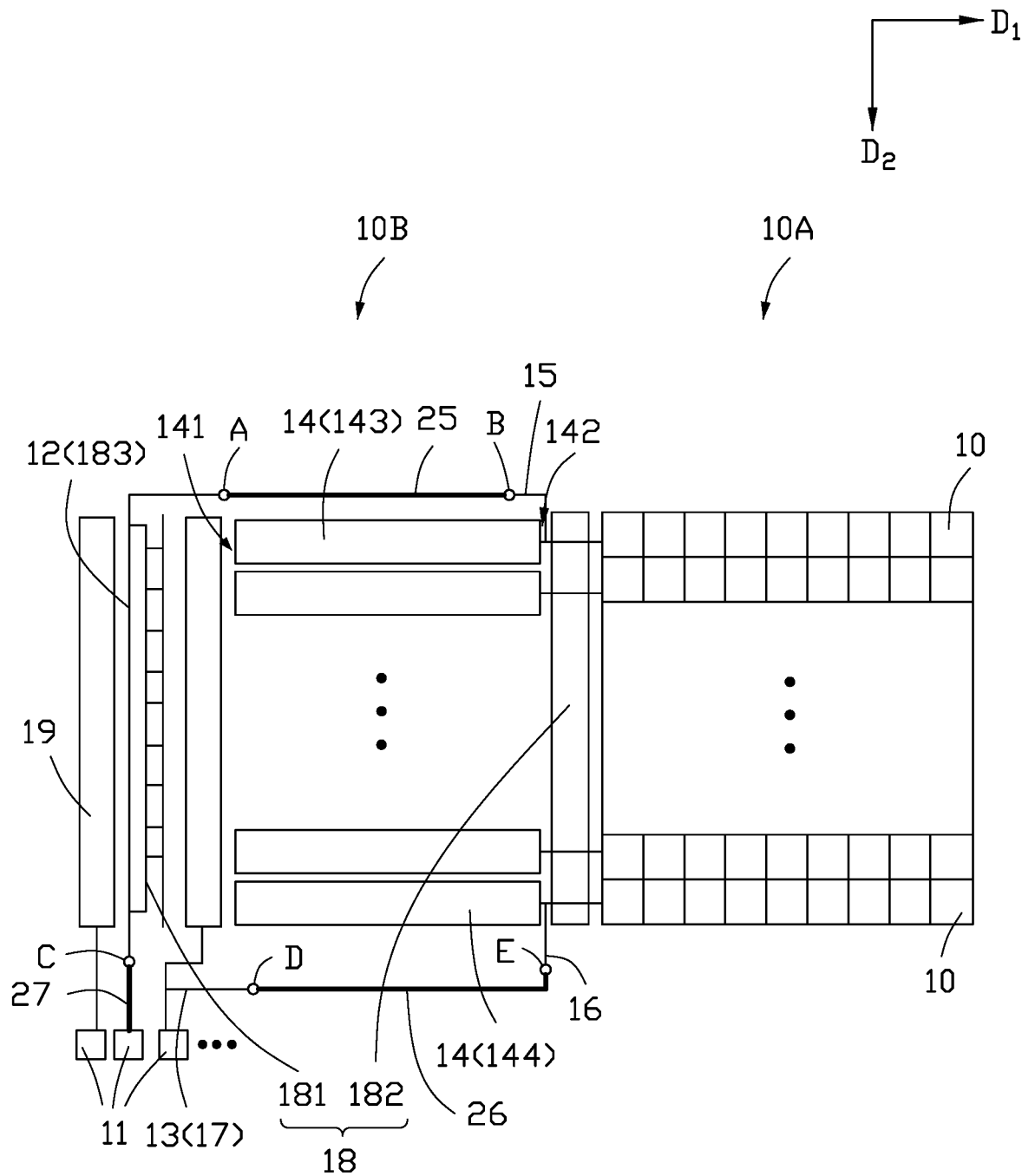
FIG. 1 is a plan view of a thin film transistor substrate according to a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one".

First Embodiment

FIG. 1 shows a thin film transistor (TFT) substrate 100 according to a first embodiment. The TFT substrate 100 defines a display area 10A and a non-display area 10B surrounding the display area 10A. The TFT substrate 100 includes a plurality of pixels 10 in the display area 10A. The pixels 10 are arranged in a matrix which includes columns along a first direction D1 and rows along a second direction D2, D2 intersecting the first direction D1. In one embodiment, the first direction D1 is perpendicular to the second direction D2.

The TFT substrate 100 includes a plurality of gate driving units 14, a first function line 12, a first-stage gate output signal line 15, and a plurality of test pads 11, all in the non-display area 10B. The test pads 11 are using for signal testing of the TFT substrate 100. The gate driving units 14 are arranged in a column along the second direction D2. A gate driving unit 14 at the head of the column of the gate driving units 14 is defined as a first-stage gate driving unit 143, and a gate driving unit 14 at the end of the column of the gate driving units 14 is defined as a final-stage gate driving unit. Each gate driving unit 14 includes an input terminal 141 and an output terminal 142. The output terminal 142 of each gate driving unit 14 is electrically connected to one row of pixels 10 in the display area 10A, to drive the row of pixels 10. The first-stage gate output signal line 15 is electrically connected to the output terminal 142 of the first-stage gate driving unit 143. The first function line 12 has a first function and can be multiplexed as a connecting line between the first-stage gate output signal line 15 and one test pad 11.

Figure 3:
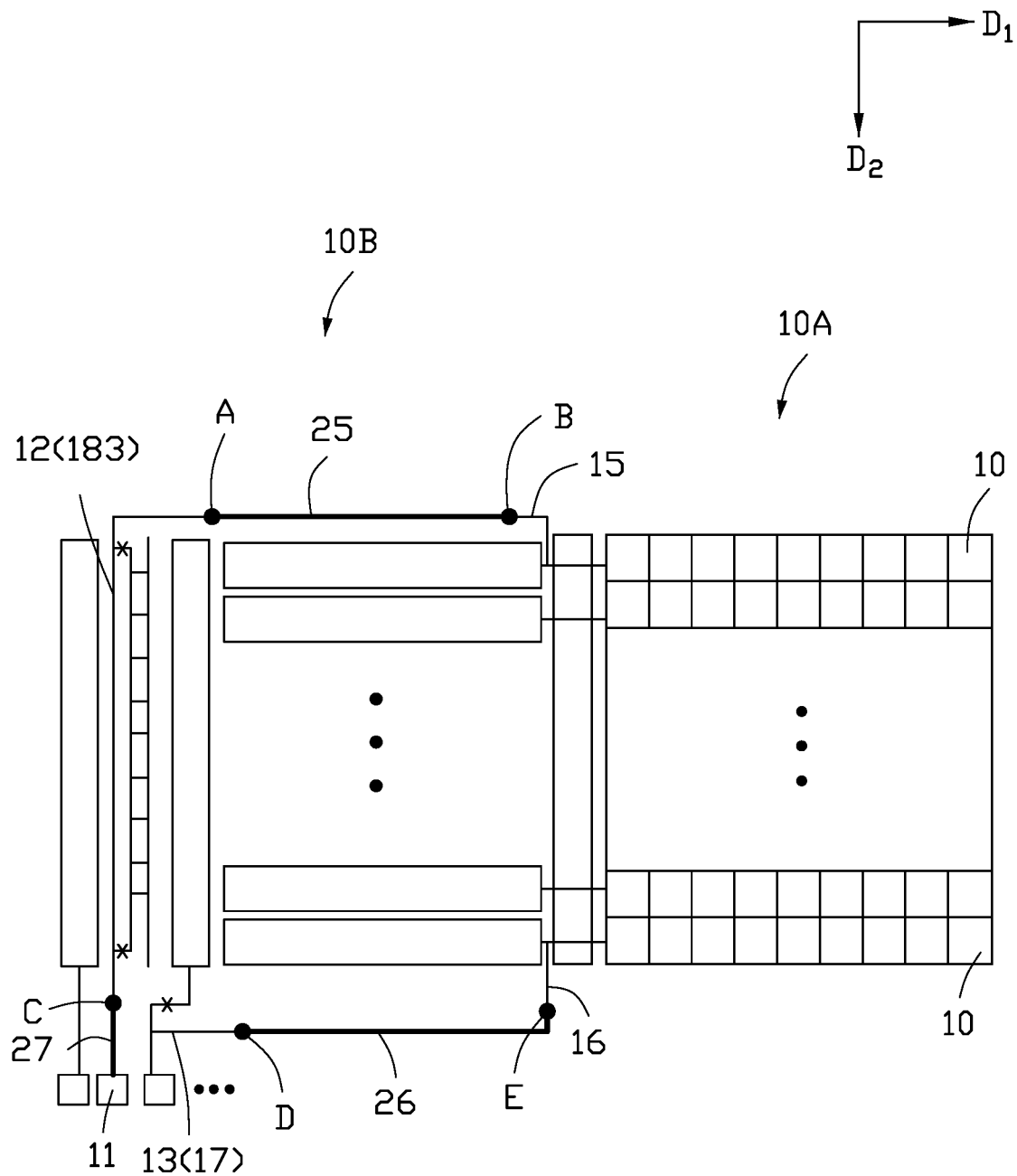
FIG. 3 is a plan view of the thin film transistor substrate in another state.

FIG. 1 shows the first function line 12 performing the first function, the first function is to provide a common voltage for the TFT substrate 100. In FIG. 1, a first trace 25 is between the first-stage gate output signal line 15 and the first function line 12, and a third trace 27 is between the first function line 12 and a test pad 11. When the first function line 12 performs the first function, the first-stage gate output signal line 15 is electrically insulated from the first function line 12 (nodes A, B, and C in FIG. 1 are hollow). That is, the first trace 25 is insulated from the first-stage gate output signal line 15 and the first function line 12, and the first function line 12 is insulated from the test pad 11. FIG. 3 shows the first function line 12 in a state of multiplexing as the connecting line. When the first function line 12 is multiplexed as the connecting line, the first-stage gate output signal line 15 is electrically connected to the first function line 12 (nodes A, B, and C in FIG. 3 are solid and conductive). That is, the first trace 25 is electrically connected to the first-stage gate output signal line 15 and the first function line 12, and the first function line 12 is electrically connected to the test pad 11. When testing whether signals provided to the TFT substrate 100 are normal, the test pads 11 are electrically connected to an oscilloscope (not shown). The oscilloscope detects whether the signals on the first-stage gate output signal line 15 is normal to determine whether the signals provided by the first-stage gate driving unit 143 to the pixels 10 electrically connected thereto are normal.

Compared with conventional TFT substrates, the first function line 12 of the TFT substrate 100 can function in a multiplexed manner. Thus, the connecting line can connect or disconnect between the first-stage gate output signal line 15 and the test pad 11, instead of the first-stage gate output signal line 15 being connected to one test pad and the first function line 12 being necessarily connected to another test pad. That is, there is no need to additionally provide a connecting line between the first-stage gate output signal line 15 and the test pad 11 and there is no need to additionally provide a test pad for connecting the first-stage gate output signal line 15. The space occupied by the first-stage gate output signal line 15 and the test pad 11 on the TFT substrate 100 is saved, and a narrower border design can be achieved.

As shown in FIG. 1, a common electrode circuit 18 is in the non-display area 10B. The common electrode circuit 18 includes an external common electrode circuit 181 and an internal common electrode circuit 182. The external common electrode circuit 181 is electrically connected to the internal common electrode circuit 182 and is electrically connected to common electrodes (not shown) in the display area 10A to provide a common voltage for the common electrodes. The internal common electrode circuit 182 is closer than the external common electrode circuit 181 to the display area 10A. The external common electrode circuit 181 includes a plurality of common electrode lines 183, and a shape and structure of the internal common electrode circuit 182 may be the same as those of the external common electrode circuit 181. In one embodiment, the first function line 12 is one of the common electrode lines 183 in the external common electrode circuit 181. One end of the first-stage gate output signal line 15 is electrically connected to the output terminal 142 of the first-stage gate driving unit 143. One of the common electrode lines 183 can be multiplexed as the connecting line between the first-stage gate output signal line 15 and one test pad 11. The first function is to provide a common voltage for the TFT substrate 100. When the first function line 12 (i.e., one of the common electrode lines 183) provides a common voltage for the TFT substrate 100, the other end of the first-stage gate output signal line 15 is electrically insulated from the first function line 12. When the first function line 12 is multiplexed as the connecting line between the first-stage gate output signal line 15 and the test pad 11, the other end of the first-stage gate output signal line 15 is electrically connected to the first function line 12.

As shown in FIG. 1, there is a plurality of gate signal lines 17 electrically connected to the gate driving units 14 in the non-display area 10B. The gate signal lines 17 transmit control signals for controlling the pixels 10 to the gate driving units 14. Each gate driving unit 14 receives the control signals transmitted by the gate signal lines 17 through the input terminal 141 and provides the control signals to the pixels 10 connected to it through the output terminal 142.

In one embodiment, there are a second function line 13 and a final-stage gate output signal line 16 in the non-display area 10B. The final-stage gate output signal line 16 is electrically connected to the output terminal 142 of the final-stage gate driving unit 144. In addition to the second function line 13 multiplexing as a connecting line between the final-stage gate output signal line 16 and one test pad 11, it has a second function. In one embodiment, the second function is to transmit control signals for controlling the pixels 10 to the gate driving units 14. The second function line 13 is one of the gate signal lines 17. FIG. 1 shows the second function line 13 performing the second function. In FIG. 1, a second trace 26 is between the final-stage gate output signal line 16 and the second function line 13, the second function line 13 being electrically connected to one test pad 11. When the second function line 13 (i.e., one of the gate signal lines 17) performs the second function, the final-stage gate output signal line 16 is electrically insulated from the gate signal line 17 (nodes D and E in FIG. 1 are hollow), so the final-stage gate output signal line 16 is electrically insulated from the test pad 11. FIG. 3 shows the second function line 13 multiplexed as the connecting line. When the second function line 13 (i.e., one of the gate signal lines 17) is multiplexed as the connecting line between the final-stage gate output signal line 16 and the test pad 11, the other end of the final-stage gate output signal line 16 is electrically connected to the second function line 17 (nodes D and E in FIG. 3 are solid and conductive). That is, the second trace 26 is electrically connected to the final-stage gate output signal line 16 and the second function line 13, so the final-stage gate output signal line 16 is electrically connected to the test pad 11.

The second function line 13 can multiplex as the connecting line between the final-stage gate output signal line 16 and the test pad 11, thus the final-stage gate output signal line 16 being connected to one test pad does not require the second function line 13 to be connected to another test pad. That is, there is no need to additionally provide a connecting line between the final-stage gate output signal line 16 and the test pad 11 and there is no need to additionally provide a test pad 11 for connecting the final-stage gate output signal line 16. The space occupied by the final-stage gate output signal line 16 and the test pad 11 on the TFT substrate 100 is saved, and a narrow border is realized.

Figure 2:
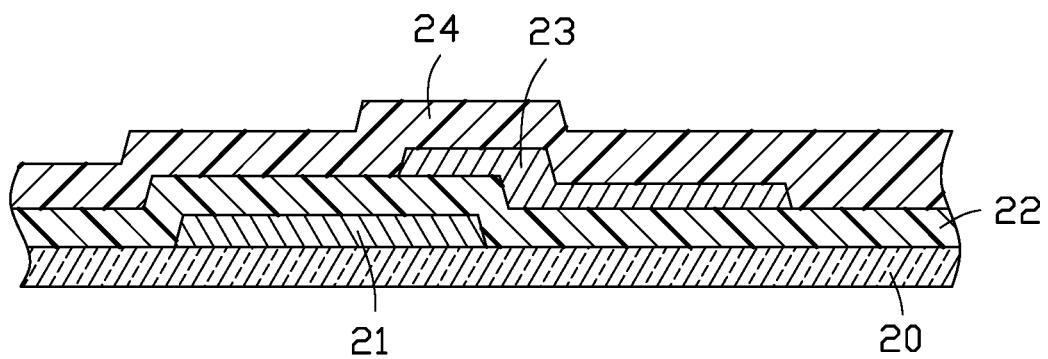
FIG. 2 is a cross-sectional view of the thin film transistor substrate in FIG. 1.

As shown in FIG. 2, the TFT substrate 100 includes a substrate 20, a first metal layer 21 on the substrate 20, a first insulating layer 22 on the substrate 20 and covering the first metal layer 21, a second metal layer 23 on the first insulating layer 22 and a second insulating layer 24 on the substrate 20 and covering the second metal layer 23. The first insulating layer 22 and the second insulating layer 24 are electrically insulated. The first metal layer 21 and the second metal layer 23 are on opposite sides of the first insulating layer 22. In one embodiment, the first-stage gate output signal line 15, the final-stage gate output signal line 16, the first function line 12, and the second function line 13 are patterned by the first metal layer 21. The first trace 25, the second trace 26, and the third trace 27 are patterned by the second metal layer 23. That is, the first metal layer 21 includes the first-stage gate output signal line 15, the final-stage gate output signal line 16, the first function line 12, and second function line 13. The second metal layer 23 includes the first, second, and third traces 25, 26, and 27. In one embodiment, the common electrode circuit 18 and the gate signal lines 17 are patterned by the first metal layer 21.

In one embodiment, along a thickness direction of the substrate 20, projections of two ends the first trace 25 on the first insulating layer 22 respectively overlap with projections of the first-stage gate output signal line 15 and the first function line 12 on the first insulating layer 22. That is, one end of the first trace 25 overlaps with the first-stage gate output signal line 15, and the other end of the first trace 25 overlaps with the first function line 12. Along the thickness direction of the substrate 20, a projection of an end of the third trace 27 on the first insulating layer 22 overlaps with a projection of the first function line 12 on the first insulating layer 22. In FIGS. 1 and 3, positions of the first trace 25 overlapping with the first function line 12 and the first-stage gate output signal line 15 are labeled as note A and note B. A position of the third trace 27 overlapping with the first function line 12 is labeled as note C. When the first function line 12 is performing the first function, the first trace 25 is insulated from the first trace 25 and the first function line 12 by the first insulating layer 22, and the third trace 27 is insulated from the first function line 12 by the first insulating layer 22. That is, the first metal layer 21 and the third metal layer 23 at the positions of notes A, B, and C are overlapped but not connected. When the first function line 12 is multiplexing as the connecting line, the two ends of the first trace are fused with the first-stage gate output signal line 15 and the first function line 12 by laser to allow the first-stage gate output signal line 15 to be electrically connected to the first function line 12, and the third trace 27 is fused with the first function line 12 by laser to allow the first function line 12 to be electrically connected to the test pad 11. That is, the first metal layer 21 and the third metal layer 23 at the positions of notes A, B, and C are connected to each other.

As shown in FIG. 3, when the first function line 12 is one of the common electrode lines 183 in the external common electrode circuit 181, the first-stage gate output signal line 15 and the common electrode line 183 are connected to each other by the first trace 25, and the common electrode line 183 is connected to the test pad 11 by the third trace 27. In one embodiment, a laser machine is used to fuse the positions of notes A, B, and C, so as to realize the electrical connection between the first-stage gate output signal line 15 and the common electrode line 183, and the electrical connection between the common electrode line 183 and the test pad 11. In addition, a connection between the common electrode line 183 and other common electrode lines in the external common electrode circuit 181 is cut off (shown as "x" in FIG. 3). Thus, the first-stage gate output signal line 15 is connected to the test pad 11 through the common electrode line 183 and the third trace 27, and the presence of a normal signal to the first-stage gate output signal line 15 can be tested by the test pad 11 connected thereto.

In one embodiment, along the thickness direction of the substrate 20, projections of two ends of the second trace 26 on the first insulating layer 22 overlap with projections of the final-stage gate output signal line 16 and the second function line 13 on the first insulating layer 22. That is, one end of the second trace 26 overlaps with the final-stage gate output signal line 16, and the other end of the second trace 26 overlaps with the second function line 13. In FIGS. 1 and 3, positions of the second trace 26 overlapping with the second function line 13 and the final-stage gate output signal line 16 are labeled as note D and note E. When the second function line 13 is performing the second function, the second trace 26 is insulated from the second function line 13 and the final-stage gate output signal line 16 by the first insulating layer 22. That is, the first metal layer 21 and the third metal layer 23 at the positions of notes D and E are overlapped but not connected. When the second function line 13 is multiplexed as the connecting line, the two ends of the second trace 26 are fused with the second function line 13 and the final-stage gate output signal line 16 by laser to allow the final-stage gate output signal line 16 to be electrically connected to the second function line 13. Thus, the final-stage gate output signal line 16 is electrically connected to the test pad 11. The first metal layer 21 and the third metal layer 23 at the positions of notes D and E are connected to each other.

As shown in FIG. 3, when the second function line 13 is one of the gate signal lines 17, the final-stage gate output signal line 16 and the gate signal line 17 are connected to each other by the second trace 26. In one embodiment, a laser machine is used to fuse the positions of notes D and E, so as to realize the electrical connection between the final-stage gate output signal line 16 and the second function line 13. In addition, a connection between the second function line 13 and other gate signal lines is cut off (shown as "x" in FIG. 3). Thus, the final-stage gate output signal line 16 is connected to the test pad 11 through the second trace 26 and one of the gate signal lines 17, and the presence of a normal signal to the final-stage gate output signal line 16 can be tested-for by the test pad 11 connected thereto.

As shown in FIGS. 1 and 3, there is an electrostatic protection line 19 in the non-display area 10B for electrostatic protection of the TFT substrate 100. The electrostatic protection line 19 is connected to one of the test pads 11 to test the static electricity protection capability of the TFT substrate 100. In one embodiment, the first function line 12, the second function line 13, the first-stage gate output signal line 15, the final-stage gate output signal line 16, the gates signal line 17 and the test pads 11 and the gate driving units 14 are on a same side of the display area 10A. In one embodiment, the test pads 11 extend along the first direction D1 and are on a same side of the final-stage gate driving unit 144.

In one embodiment, on a side of the display area 10A opposite to the non-display area 10B, there is a plurality of other gate driving units 14, another first function line 12, another second function line 13, another first-stage gate output signal line 15, another final-stage gate output signal line 16, a plurality of other gate signal lines 17, and a plurality of other test pads 11. The gate driving units 14 in the non-display area 10B are connected to even rows of pixels 10, and the other gate driving units 14 on the side of the display area 10A opposite to the non-display area 10B are connected to odd rows of pixels 10.

Second Embodiment

Figure 4:
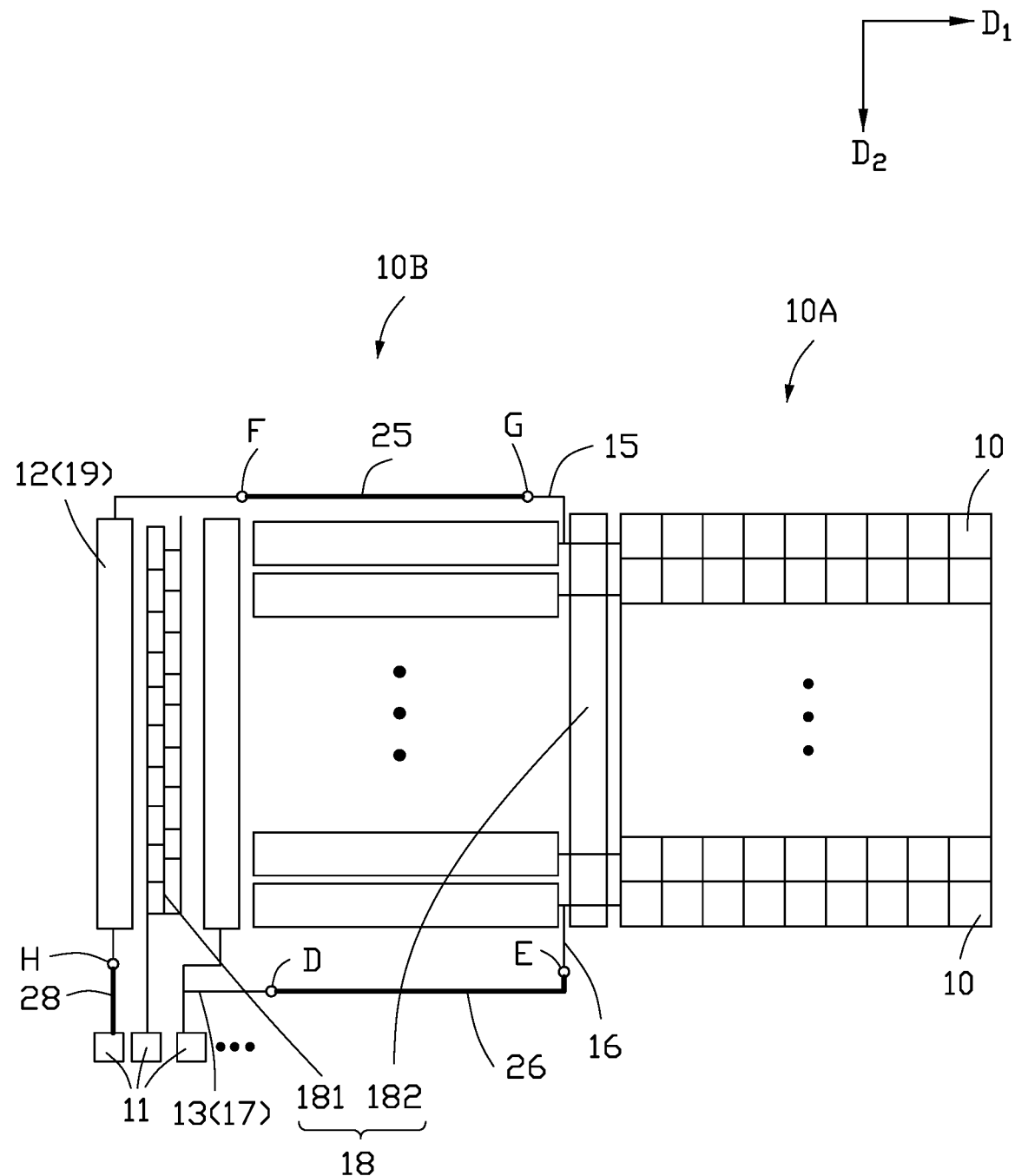
FIG. 4 is a plan view of the thin film transistor substrate according to a second embodiment.

FIG. 4 shows a TFT substrate 200 according to a second embodiment. The difference between the TFT substrate 200 and the TFT substrate 100 is that the first function line 12 is the electrostatic protection line 19, instead of the common electrode line 183 having that function. That is, the electrostatic protection line has the first function and can multiplex as a connecting line between the first-stage gate output signal line 15 and one of the test pads 11. The first function is to provide electrostatic protection for the TFT substrate 100. The electrostatic protection line 19 is patterned by the first metal layer 21.

Figure 5:
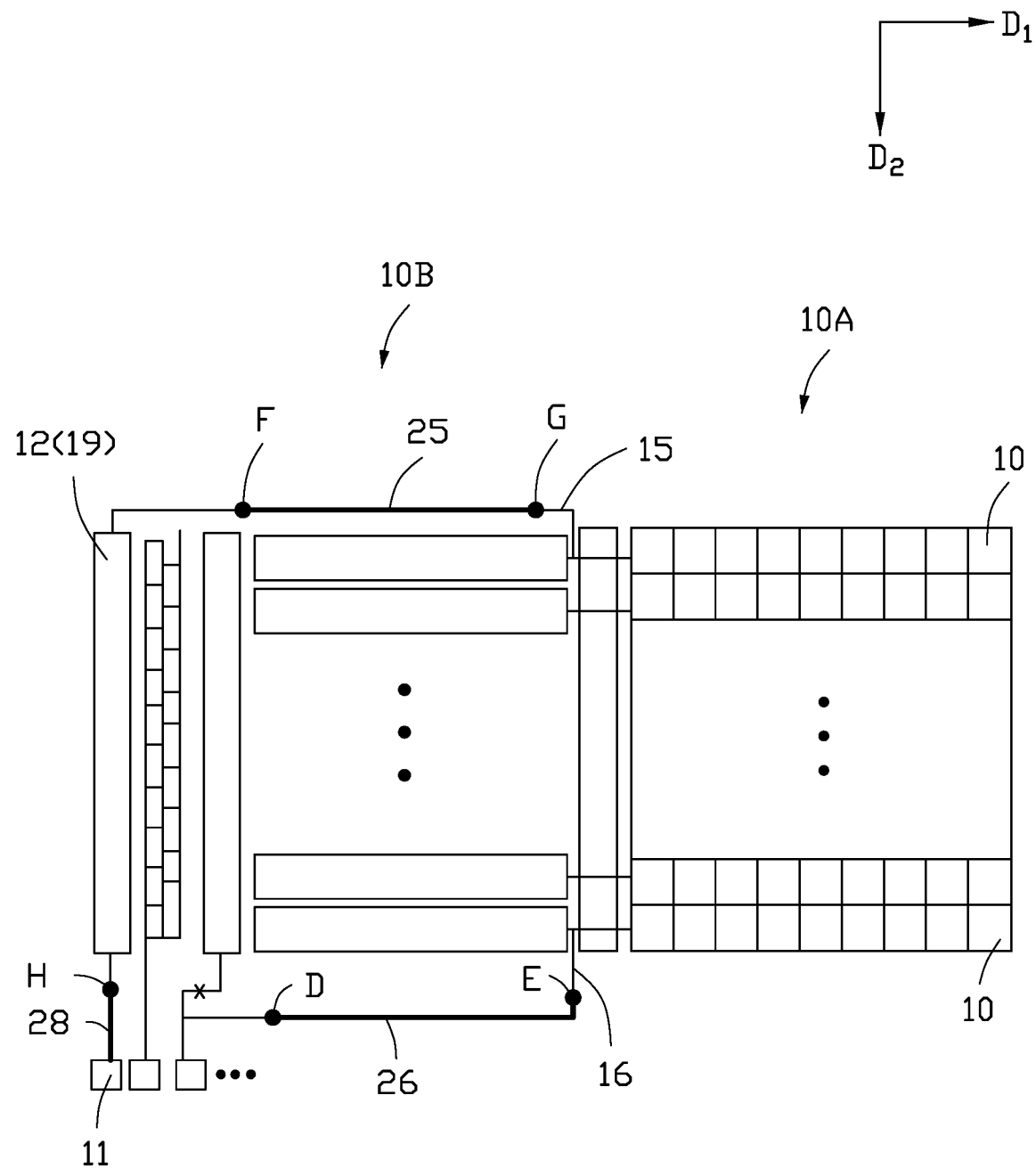
FIG. 5 is a plan view of the thin film transistor substrate of FIG. 4 in another state.

In one embodiment, along the thickness direction of the substrate 20, projections of two ends the first trace 25 on the first insulating layer 22 overlap with projections of the first-stage gate output signal line 15 and the first function line 12 (e.g., the electrostatic protection line 19 in FIG. 4) on the first insulating layer 22. That is, one end of the first trace 25 overlaps with the first-stage gate output signal line 15, and the other end of the first trace 25 overlaps with the first function line 12. A fourth trace 28 is between the electrostatic protection line 19 and one of the test pads 11. Along the thickness direction of the substrate 20, a projection of an end of the fourth trace 28 on the first insulating layer 22 overlaps with a projection of the first function line 12 (e.g., the electrostatic protection line 19 in FIG. 4) on the first insulating layer 22. In FIGS. 4 and 5, positions of the first trace 25 overlapping with the first function line 12 and the first-stage gate output signal line 15 are labeled as note F and note G. A position of the fourth trace 28 overlapping with the first function line 12 is labeled as note H. As shown in FIG. 4, when the first function line 12 is performing the first function, the first trace 25 is insulated from the first trace 25 and the first function line 12 by the first insulating layer 22, and the fourth trace 28 is insulated from the first function line 12 by the first insulating layer 22. That is, the first metal layer 21 and the third metal layer 23 at the positions of notes F, G, and H are overlapped but not connected. As shown in FIG. 5, when the first function line 12 is multiplexed as the connecting line, the two ends of the first trace 25 are fused with the first-stage gate output signal line 15 and the first function line 12 by laser to allow the first-stage gate output signal line 15 to be electrically connected to the first function line 12, and the fourth trace 28 is fused with the first function line 12 by laser to allow the first function line 12 to be electrically connected to the test pad 11. That is, the first metal layer 21 and the third metal layer 23 at the positions of notes F, G, and H are connected to each other.

In one embodiment, a laser machine is used to fuse the positions of notes F, G and H, so as to realize the electrical connection between the first-stage gate output signal line 15 and the electrostatic protection line 19, and the electrical connection between the electrostatic protection line 19 and the test pad 11. Thus, the first-stage gate output signal line 15 is connected to the test pad 11 through the electrostatic protection line 19 and the fourth trace 28, and the presence of a normal signal to the first-stage gate output signal line 15 can be detected or tested by the test pad 11 connected thereto.

The space saved on the TFT substrate can be used to improve other performances. For example, a distance between adjacent components on the TFT substrate (such as resistors, capacitors, or thin film transistors) can be increased to relieve density, or a distance between adjacent components and signal lines (such as the electrostatic protection line 19, the common electrode circuit 18 or the gate signal line 17) can be increased to avoid the risk of electrostatic damage. The space saved by the TFT substrate can be used for the benefit of components and signal lines. Thus, the risk of electrostatic damage is effectively reduced. Additionally, the space saved by the TFT substrate can be used to widen the electrostatic protection line, or to widen the distance between the electrostatic protection line and the signal lines adjacent to the electrostatic protection line to effectively improve the antistatic qualities of the TFT substrate.

Figure 6:
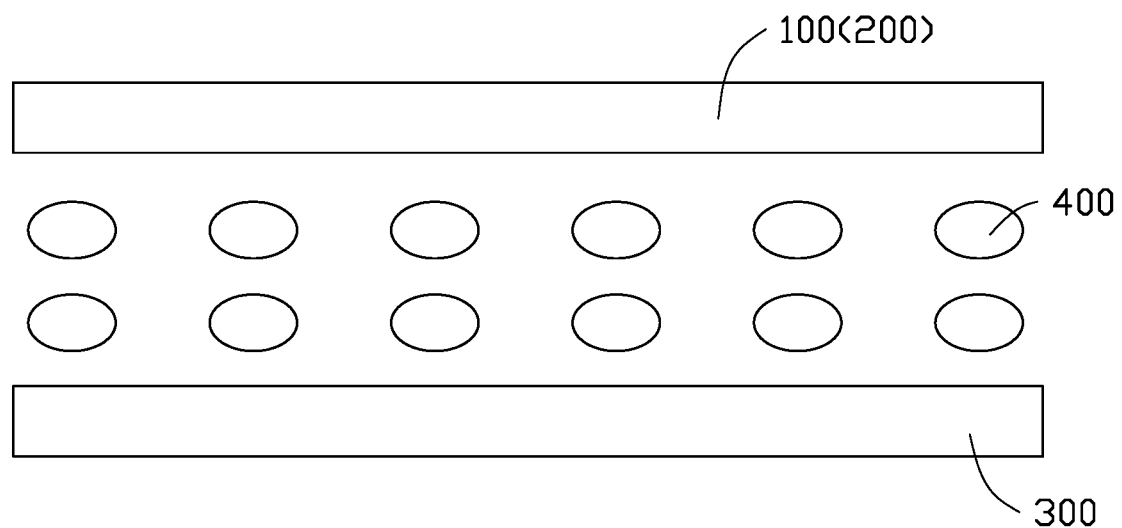
FIG. 6 is a cross-sectional view of a liquid crystal display panel using the thin film transistor substrate in one embodiment.

FIG. 6 shows a liquid crystal display panel 500 according to an embodiment. The liquid crystal display panel 500 includes the TFT substrate 100 (or 200), a color filter substrate 300 opposite to the TFT substrate 100 (or 200), and a liquid crystal layer 400 between the TFT substrate 100 (or 200) and the color filter substrate 300.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A thin film transistor substrate having a display area and a non-display area surrounding the display area, comprising: a plurality of pixels in the display area and arranged in a matrix comprising columns along a first direction and rows along a second direction intersecting the first direction;
a plurality of gate driving units in the non-display area and arranged in a column along the second direction, a gate driving unit at the head of the column of the plurality of gate driving units being defined as a first-stage gate driving unit, and a gate driving unit at the end of the column of the plurality of gate driving units being defined as a final-stage gate driving unit, each of the plurality of gate driving units having an input terminal and an output terminal, the output terminal of each of the plurality of gate driving units being electrically connected to one of rows of the plurality of pixels;
a plurality of test pads in the non-display area configured for signal testing of the thin film transistor substrate;
a first function line in the non-display area; and
a first-stage gate output signal line in the non-display area, the first-stage gate output signal line being electrically connected to the output terminal of the first-stage gate driving unit,
wherein the first function line has a first function and is multiplexed as a connecting line between the first-stage gate output signal line and one of the plurality of test pads; and
the first-stage gate output signal line is configured to be electrically insulated from the first function line when the first function line performs the first function, and to be electrically connected to the first function line when the first function line is multiplexed as the connecting line;
the thin film transistor substrate further comprises a substrate, a first metal layer on the substrate, and a first insulating layer on the substrate and covering the first metal layer, the first insulating layer is electrically insulated, the first metal layer comprises the first-stage gate output signal line and the first function line;
the thin film transistor substrate further comprises a second metal layer on the first insulating layer, the second metal layer comprises a first trace;
along a thickness direction of the substrate, projections of two ends of the first trace on the first insulating layer respectively overlap with projections of the first-stage gate output signal line and the first function line on the first insulating layer;
when the first function line is multiplexed as the connecting line, the two ends of the first trace are configured to be fused with the first-stage gate output signal line and the first function line by laser to allow the first-stage gate output signal line to be electrically connected to the first function line.

2. The thin film transistor substrate of claim 1, wherein the first function line is an electrostatic protection line, and the first function is electrostatic protection.

3. The thin film transistor substrate of claim 1, further comprising a plurality of common electrode lines in the non-display area, wherein the first function line is one of the plurality of common electrode lines, and the first function is to provide a common voltage.

4. The thin film transistor substrate of claim 1, further comprising a second function line and a final-stage gate output signal line in the non-display area, wherein the final-stage gate output signal line is electrically connected to the output terminal of the final-stage gate driving unit, the second function line has a second function and is multiplexed as a connecting line between the final-stage gate output signal line and one of the plurality of test pads; the final-stage gate output signal line is configured to be electrically insulated from the second function line when the second function line performs the second function, and to be electrically connected to the second function line when the second function line is multiplexed as the connecting line between the final-stage gate output signal line and one of the plurality of test pads.

5. The thin film transistor substrate of claim 4, further comprising a plurality of gate signal lines in the non-display area, wherein each of the plurality of gate signal lines is electrically connected to the input terminal of one of the plurality of gate driving units, the second function line is one of the plurality of gate signal lines, and the second function is to transmit control signals for controlling the plurality of pixels to the plurality of gate driving units.

6. The thin film transistor substrate of claim 5, wherein the first metal layer comprises the final-stage gate output signal line, and the second function line.

7. The thin film transistor substrate of claim 6, wherein the second metal layer comprises a second trace;
along the thickness direction of the substrate, projections of two ends of the second trace on the first insulating layer respectively overlap with projections of the final-stage gate output signal line and the second function line on the first insulating layer;
when the second function line is multiplexed as the connecting line, the two ends of the second trace are configured to be fused with the final-stage gate output signal line and the second function line by laser to allow the final-stage gate output signal line to be electrically connected to the second function line.

8. The thin film transistor substrate of claim 6, wherein the first function line, the second function line, the first-stage gate output signal line, the final-stage gate output signal line, the plurality of gate signal lines, the plurality of test pads and the plurality of gate driving units are on a same side of the display area.

9. The thin film transistor substrate of claim 8, further comprising a plurality of other gate driving units in the non-display area opposite to the side of the non-display area having the plurality of gate driving units; the plurality of gate driving units is connected to even rows of the plurality of pixels, and the plurality of other gate driving units is connected to odd rows of the plurality of pixels.

10. A liquid crystal display panel, comprising a thin film transistor substrate, a color filter substrate opposite to the thin film transistor substrate, and a liquid crystal layer between the thin film transistor substrate and the color filter substrate, the thin film transistor substrate having a display area and a non-display area surrounding the display area, comprising:
a plurality of pixels in the display area and arranged in a matrix comprising columns along a first direction and rows along a second direction intersecting the first direction;
a plurality of gate driving units in the non-display area and arranged in a column along the second direction, a gate driving unit at the head of the column of the plurality of gate driving units being defined as a first-stage gate driving unit, and a gate driving unit at the end of the column of the plurality of gate driving units being defined as a final-stage gate driving unit, each of the plurality of gate driving units having an input terminal and an output terminal, the output terminal of each of the plurality of gate driving units being electrically connected to one of rows of the plurality of pixels;
a plurality of test pads in the non-display area configured for signal testing of the thin film transistor substrate;
a first function line in the non-display area; and
a first-stage gate output signal line in the non-display area, the first-stage gate output signal line being electrically connected to the output terminal of the first-stage gate driving unit,
wherein the first function line has a first function and is multiplexed as a connecting line between the first-stage gate output signal line and one of the plurality of test pads; and
the first-stage gate output signal line is configured to be electrically insulated from the first function line when the first function line performs the first function, and to be electrically connected to the first function line when the first function line is multiplexed as the connecting line;
the thin film transistor substrate further comprises a substrate, a first metal layer on the substrate, and a first insulating layer on the substrate and covering the first metal layer, the first insulating layer is electrically insulated, the first metal layer comprises the first-stage gate output signal line and the first function line;
the thin film transistor substrate further comprises a second metal layer on the first insulating layer, the second metal layer comprises a first trace;
along a thickness direction of the substrate, projections of two ends of the first trace on the first insulating layer respectively overlap with projections of the first-stage gate output signal line and the first function line on the first insulating layer;
when the first function line is multiplexed as the connecting line, the two ends of the first trace are configured to be fused with the first-stage gate output signal line and the first function line by laser to allow the first-stage gate output signal line to be electrically connected to the first function line.

11. The liquid crystal display panel of claim 10, wherein the first function line is an electrostatic protection line, and the first function is electrostatic protection.

12. The liquid crystal display panel of claim 10, wherein the thin film transistor substrate further comprises a plurality of common electrode lines in the non-display area, wherein the first function line is one of the pluralities of common electrode lines, and the first function is to provide a common voltage.

13. The liquid crystal display panel of claim 10, wherein the thin film transistor substrate further comprises a second function line and a final-stage gate output signal line in the non-display area, wherein the final-stage gate output signal line is electrically connected to the output terminal of the final-stage gate driving unit, the second function line has a second function and is multiplexed as a connecting line between the final-stage gate output signal line and one of the plurality of test pads; the final-stage gate output signal line is configured to be electrically insulated from the second function line when the second function line performs the second function, and to be electrically connected to the second function line when the second function line is multiplexed as the connecting line between the final-stage gate output signal line and one of the plurality of test pads.

14. The liquid crystal display panel of claim 13, wherein the thin film transistor substrate further comprises a plurality of gate signal lines in the non-display area, wherein each of the plurality of gate signal lines is electrically connected to the input terminal of one of the plurality of gate driving units, the second function line is one of the plurality of gate signal lines, and the second function is to transmit control signals for controlling the plurality of pixels to the plurality of gate driving units.

15. The liquid crystal display panel of claim 14, wherein the first metal layer comprises the final-stage gate output signal line and the second function line.

16. The liquid crystal display panel of claim 15, wherein the second metal layer comprises a second trace;
   along the thickness direction of the substrate, projections of two ends of the second trace on the first insulating layer respectively overlap with projections of the final-stage gate output signal line and the second function line on the first insulating layer;
   when the second function line is multiplexed as the connecting line, the two ends of the second trace are configured to be fused with the final-stage gate output signal line and the second function line by laser to allow the final-stage gate output signal line to be electrically connected to the second function line.

17. The liquid crystal display panel of claim 15, wherein the first function line, the second function line, the first-stage gate output signal line, the final-stage gate output signal line, the plurality of gate signal lines, the plurality of test pads and the plurality of gate driving units are on a same side of the display area.

18. The liquid crystal display panel of claim 17, wherein the thin film transistor substrate further comprises a plurality of other gate driving units in the non-display area opposite to the side of the non-display area having the plurality of gate driving units; the plurality of gate driving units is connected to even rows of the plurality of pixels, and the plurality of other gate driving units is connected to odd rows of the plurality of pixels.

* * * * *